Sept. 13, 1932.    L. A. HYLAND    1,877,131
THERMOSTAT
Filed March 9, 1929

INVENTOR.
Lawrence A. Hyland,
BY Harold Dodd
ATTORNEY.

Patented Sept. 13, 1932

1,877,131

UNITED STATES PATENT OFFICE

LAWRENCE A. HYLAND, OF WASHINGTON, DISTRICT OF COLUMBIA, ASSIGNOR TO WIRED RADIO, INC., OF NEW YORK, N. Y., A CORPORATION OF DELAWARE

THERMOSTAT

Application filed March 9, 1929. Serial No. 345,866.

My invention relates broadly to thermostats and more particularly to thermostats adapted to control electrical circuits.

One of the objects of my invention is to provide a thermostat wherein the calibration remains substantially correct irrespective of excessive temperature changes.

Another object of my invention is to provide a thermostat having electrical contact members designed to prevent irregularities in the operating characteristics of the thermostat.

Figure 1:
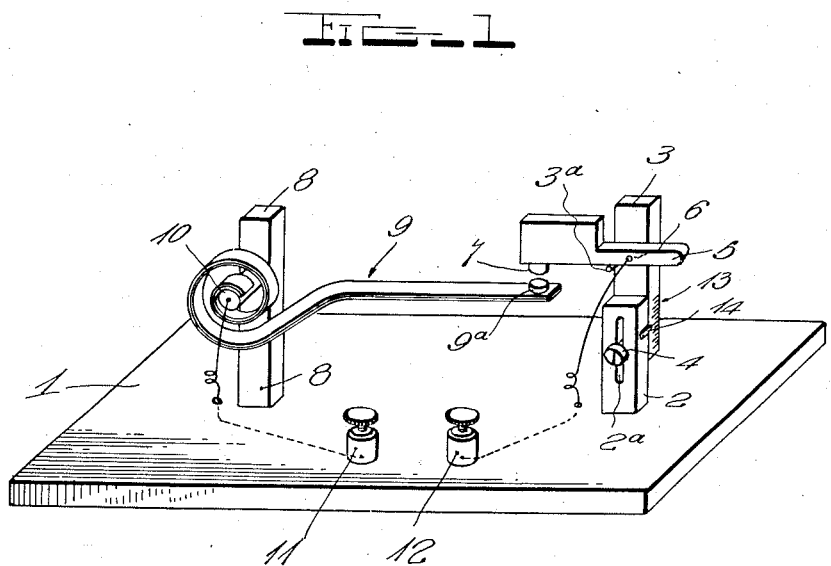
Figure 2:
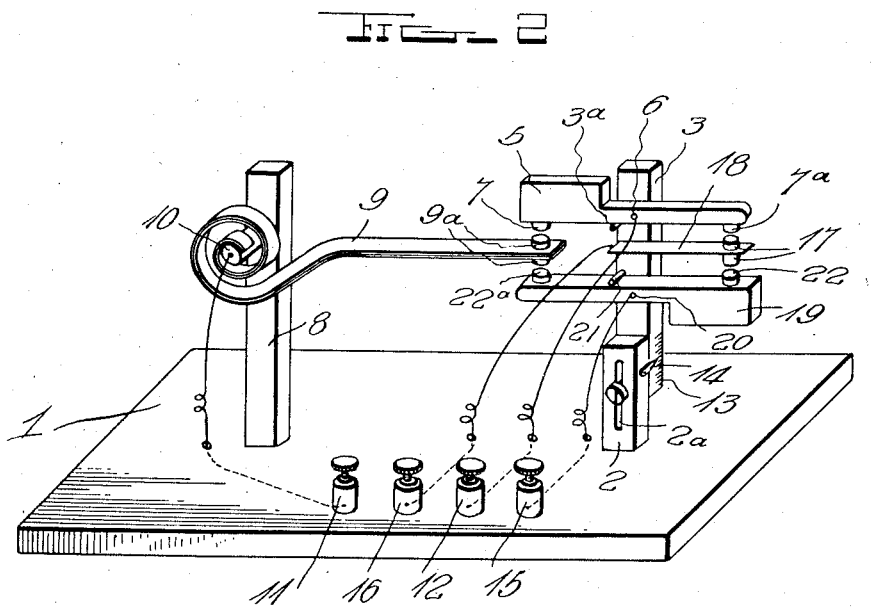

Other and further objects of my invention resides in certain structural features for an improved thermostat, a better understanding of which can be had from the specification following and from the accompanying drawing, wherein:

Figure 1 illustrates one form of the thermostat of my invention; and Fig. 2 shows a modification of the thermostat of my invention.

Thermostats are employed in many different applications where changes of temperature are indicated by the control of electrical circuits. Thermostats have been employed heretofore in the art of various designs and operating characteristics. The principle of operation generally makes use of the difference in the coefficient of expansion of different metallic strips. Two metallic strips having unlike expansion coefficients are positioned adjacent each other. An increase of temperature causes one of the metallic strips to expand a greater amount than the other metallic strip, which causes the two metallic strips to bend in the direction of the metallic strip of lowest expansive properties. Contacts of suitable conductive properties are carried by the bi-metallic strip and are so positioned as to establish connection with other contact members when a change of temperature occurs. It is possible to accurately calibrate the thermostat with respect to the required temperature necessary to complete an external circuit and this calibration proves especially valuable where temperatures are to be maintained within certain narrow limits. When, however, the thermostat has been accurately calibrated it is difficult to maintain the adjustment of the thermostat. This is due to the fact that the movement of the bi-metallic member continues after the circuit has been established, the movable contact carried by the bi-metallic member bearing against the stationary contact and bending the bi-metallic member out of its normal shape.

The thermostat of my invention avoids many difficulties experienced with other types and has many advantages as will appear from the description following:

Fig. 1 shows a side elevation of one form of the thermostat of my invention. Base 1, of metal or insulating material, supports the thermostat in its entirety. An upstanding member 2 is carried upon base 1. Member 2 has a slotted section 2a through which the body of screw 4 extends. Screw 4 engages in a threaded hole in member 3. Member 3 may be of insulating material. Screw 4 may be loosened whereby the vertical position of member 3 may be adjusted. A contact arm 5 is pivoted on member 3 by means of pin 6. Contact arm 5 carries contact 7. The pivoting of member 3 is such as to cause the force of gravity to be manifested in a direction tending to push contact 7 toward base 1. The movement of contact 7 is restricted by pin 3a in member 3. Upstanding member 8 is mounted upon base 1. Member 8 may be of metal or suitable insulating material. Bi-metallic member 9 is supported by and positioned on upstanding member 8 by means of pin 10. Bi-metallic member 9 comprises two flat strips of dissimilar metals placed alongside each other for cooperative movement. Member 9 may comprise any different metals or alloys of metals having different coefficients of expansion, such as for instance, iron and brass. Contact member 9a is carried by member 9 and is positioned near the extreme end of bi-metallic member 9. Member 9 is shown in the form of a spiral. This form provides greater sensitivity to minute changes of temperature than does the form where the member is substantially straight. Bi-metallic member 9 and contact member 9a are electrically connected to binding post 11.

Contact arm 5 and contact 7 are electrically connected to binding post 12. By means of adjusting screw 4, member 3 may be raised or lowered thereby adjusting the spacial relation between contacts 7 and 9a. This adjusts the range of temperature change which will operate the indicating circuit which connects with binding posts 11 and 12.

Fig. 2 of the drawing shows a modification of the thermostat of my invention. In this modification bi-metallic member 9 is adapted to contact with stationary contact members when the temperature increases or decreases in value. The arrangement shown in Fig. 1 is such that when a change in a given direction occurs, that is, an increase or a decrease in temperature; the contacts engage each other to close in electrical circuit. The arrangement shown in Fig. 2 is such that a separate contact is closed under conditions of an increasing temperature or a decreasing temperature. Reference characters shown in Fig. 1 correspond to those shown in Fig. 2. Contact arm 5 carries a contact 7. Contact 9a carried by bi-metallic member 9 is adapted to contact with member 7. Contact arm 5 has a second contact carried on the end opposite member 7. A second contact arm 19 is also employed, having contacts 32 and 22a. Contact 9a carried by bi-metallic member 9 is adapted to contact with contact 22a. Pin 21 prevents excessive movement of contact arm 19, the force of gravity acting against arm 19 tending to push contact 22a upward. Electrical connection is established between arm 5 and binding post 12 by means of a connecting wire. Contact arm 19 is in like manner connected to binding post 15. A very flexible spring member 18 carrying contact members is positioned between contact members 7a and 22. Spring member 18 is electrically connected to binding post 16. Upstanding member 3 is constructed of suitable insulating material and adjustably positioned with respect to member 2. Scale 13 and pointer 14 permit adjustment to be made and maintained whereby operation in a given range of temperature change may be effected.

In the operation of the arrangement shown in Fig. 1, contact 9a establishes connection with contact 7. Continued movement of member 9 causes arm 5 to move upwardly around the pivot 6 which movement may continue and connection maintained until contact 9a is completely free from contact 7. In the arrangement shown in Fig. 2 under similar temperature conditions contacts 9a and 7 engage and arm 5 is moved on its pivot 6 until contact is established between contact 7a and contact 17 of spring contact member 18. This may be connected to an indicating circuit thereby warning of the abnormal temperature change. Spring member 18 engages with contact 7a when contact 9a is nearly free from contact 7. The small spring tension exerted by spring 18 is not sufficient to interfere with the continued movement of member 9 and will in no way destroy the calibration. Spring member 18 may be of very light material such as very thin and narrow strip of spring brass. Spring member 17 is moved only a slight amount when contact 9a swings clear of contact 7. Contact arm 19 is adapted to control an electrical circuit when a change of temperature in the opposite direction takes place. Arm 19 is pivoted on pin 20. The pivoting is such that arm 19 normally bears against stop pin 21 by the force of gravity upon the arm.

When a change in temperature occurs such as to cause contact 9a to engage with contact 22a, contact 22a yields to the pressure exerted by member 9 and connection is complete between contacts 9a and 22a until the change has been excessive and member 9a swings clear of contact 22a. As the movement of contact 7a engaged with contact 17 of spring member 18 when an excessive change takes place, so also contact 22 engages with spring member 18 when an excessive change occurs.

Spring member 18 is not essential to indicate excessive changes of temperature. Suppose for instance contacts 7 and 9a are connected in series with a source of energy and an indicating device such as an incandescent bulb. Suppose also that contacts 9a and 22a are connected in series with a source of energy and a second indicating device. A normal change of temperature would be indicated when contacts 7 and 9a are engaged. An excessive temperature variation would cause contact 7a to engage with contact 22 and the second indicating circuit would be energized. In the latter arrangement stop pins 21 and 3a would be removed and arms 5 and 19 perfectly balanced on their respective pivots 6 and 20. A further excessive variation of temperature would cause the disengagement of contacts 7 and 9a and both indicating devices would be deenergized. In each of the modifications heretofore referred to, the contact members are controlled by the force of gravity, the force exerted upon the bi-metallic member being directly proportional to the weight of the contact members.

I realize that many modifications of my invention are possible wherein the contact members are supported in given positions by the force of gravity. It is to be understood that the embodiments of my invention are not to be restricted by the foregoing specification or by the accompanying drawing but only by the scope of the appended claims.

What I claim as new and desire to secure by Letters Patent of the United States is as follows:

1. In a thermostat, a supporting member, a bimetallic strip thermally responsive to temperature variations connected at one end to said supporting member, the other end of said strip projecting in a substantially horizontal direction, contacts carried by opposite faces of the last mentioned end of said strip, a second supporting member, a resilient strip carried by said second supporting member, a set of contacts carried by said resilient strip, a pair of balanced levers pivotally mounted on said second supporting member above and below said resilient strip and contacts carried by each of said balanced levers in alignment with the contacts on said bimetallic strip and on said resilient strip.

2. In a thermostat, a supporting member, a bimetallic strip thermally responsive to temperature variations connected at one end to said supporting member, the other end of said strip projecting in a substantially horizontal direction, contacts carried by opposite faces of the last mentioned end of said strip, a second supporting member, a resilient strip carried by said second supporting member, a set of contacts carried by said resilient strip, a pair of balanced levers pivotally mounted on said second supporting member above and below said resilient strip, contacts carried by each end of said balanced levers in alignment with the contacts on said bimetallic strip and on said resilient strip and means for vertically adjusting the position of said second supporting member for centering the contacts on said levers with respect to the contacts carried by said bimetallic strip.

3. In a thermostat the combination of a bimetallic strip thermally responsive to temperature variations whereby electrical circuits are controlled, movable contact members engaging the contact members carried by said strip, said first mentioned contact members being displaced by the movement of said strip and returned to their normal position by the gravitational force acting thereon, and an auxiliary contact member disposed between said movable contact members and remote from said strip whereby multiple connections are established during movement of said movable contact members with respect to said strip.

LAWRENCE A. HYLAND.